US012350561B2

(12) United States Patent
Luna

(10) Patent No.: US 12,350,561 B2
(45) Date of Patent: Jul. 8, 2025

(54) GOLF CLUB HEAD UTILIZING INTERNAL ADHESIVE AND METAL COMPOSITE

(71) Applicant: Acushnet Company, Fairhaven, MA (US)

(72) Inventor: Tony Luna, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 611 days.

(21) Appl. No.: 17/525,258

(22) Filed: Nov. 12, 2021

(65) Prior Publication Data
US 2022/0143474 A1 May 12, 2022

Related U.S. Application Data

(62) Division of application No. 16/800,927, filed on Feb. 25, 2020, now Pat. No. 11,198,044.

(60) Provisional application No. 62/811,454, filed on Feb. 27, 2019.

(51) Int. Cl.
*A63B 53/04* (2015.01)
*A63B 53/06* (2015.01)
*A63B 53/08* (2015.01)
*B29C 65/48* (2006.01)
*B29C 65/08* (2006.01)

(52) U.S. Cl.
CPC .............. *A63B 53/08* (2013.01); *A63B 53/06* (2013.01); *B29C 65/4815* (2013.01); *A63B 53/0475* (2013.01); *A63B 2209/08* (2013.01); *A63B 2209/10* (2013.01); *B29C 65/08* (2013.01)

(58) Field of Classification Search
CPC ..... A63B 53/08; A63B 53/06; A63B 53/0466; B29C 65/4815
See application file for complete search history.

(56) References Cited

U.S. PATENT DOCUMENTS

| 4,355,808 | A | * | 10/1982 | Jernigan | A63B 53/047 |
| | | | | | 264/129 |
| 4,502,687 | A | * | 3/1985 | Kochevar | A63B 53/0466 |
| | | | | | 473/409 |
| 4,769,406 | A | * | 9/1988 | Keithley | C09J 123/0853 |
| | | | | | 524/270 |
| 5,351,958 | A | * | 10/1994 | Helmstetter | A63B 53/04 |
| | | | | | 473/345 |
| 5,590,881 | A | * | 1/1997 | Jernigan | A63B 60/00 |
| | | | | | 473/324 |
| 5,637,045 | A | * | 6/1997 | Igarashi | A63B 60/54 |
| | | | | | 273/DIG. 8 |
| 5,643,111 | A | * | 7/1997 | Igarashi | A63B 60/00 |
| | | | | | 473/340 |
| 6,062,988 | A | * | 5/2000 | Yamamoto | A63B 53/0466 |
| | | | | | 473/409 |
| 6,306,048 | B1 | | 10/2001 | McCabe | |

(Continued)

FOREIGN PATENT DOCUMENTS

JP         H1015128 A   *  7/1996
JP         10015128         1/1998
JP         2005230455 A  *  9/2005

*Primary Examiner* — Joshua T Kennedy

(57) ABSTRACT

A golf club head is manufactured to form a cavity where the striking face of the golf club is secured to the sole and upper portion of the golf club head. A weighted composite is manipulated into a predetermined location within the cavity. The composite contains an adhesive which secures the composite within the cavity.

12 Claims, 5 Drawing Sheets

(56) References Cited

U.S. PATENT DOCUMENTS

| | | | |
|---|---|---|---|
| 8,938,871 B2* | 1/2015 | Roach | A63B 53/0466 |
| | | | 29/402.13 |
| 10,173,111 B2* | 1/2019 | Busch | A63B 53/0487 |
| 10,220,272 B2 | 3/2019 | Gonzalez et al. | |
| 10,232,276 B2 | 3/2019 | Hacking | |
| 2004/0138002 A1 | 7/2004 | Murray | |
| 2018/0171180 A1* | 6/2018 | Franz | A63B 53/047 |

* cited by examiner

GOLF CLUB HEAD UTILIZING INTERNAL ADHESIVE AND METAL COMPOSITE

CROSS-REFERENCE TO RELATED APPLICATION

This application is a division of U.S. application Ser. No. 16/800,927, filed Feb. 25, 2020, entitled "Golf Club Head Utilizing Internal Adhesive and Metal Composite," which claims benefit of U.S. Provisional Patent Application Ser. No. 62/811,454, filed Feb. 27, 2019, entitled "Golf Club Head Utilizing Internal Adhesive and Metal Composite," which applications are incorporated herein by reference in their entireties. To the extent appropriate, a claim of priority is made to each of the above disclosed applications.

BACKGROUND

The flight characteristics of a golf ball after being struck by a golf club are dependent on not only the swing of the golf club but also on the construction of the golf club itself. For instance, flight characteristics of a golf ball, such as spin of the ball and ball speed, are impacted by the design and construction of the golf club. By modifying the golf club design, the flight characteristics can be improved. Some modifications of characteristics, useful for fine tuning of performance, can be difficult to perform once a golf club or components thereof (e.g., the golf club head) are already assembled.

SUMMARY

In an aspect, the technology relates to a method of manufacturing a golf club head, the method including: forming a golf club head having a sole, an upper portion, and a striking face secured to at least one of the sole and the upper portion, wherein the sole, the upper portion and the striking face at least partially define a cavity; introducing into the cavity a composite having an adhesive constituent and a weight constituent; and manipulating the composite so as to dispose the composite in a predetermined location within the cavity. In an example manipulating the composite includes orienting the golf club head in a predetermined orientation. In another example, the adhesive constituent includes a hot melt adhesive. In yet another example, introducing the composite includes introducing the composite when the adhesive constituent is in a substantially flowable state. In still another example, introducing the composite includes introducing the composite when the adhesive constituent is in a substantially solid state.

In another example of the above aspect, manipulating the composite includes applying a heat energy to the composite. In an example, the heat energy includes at least one of convection, conduction, induction, and ultrasound. In another example, the weight constituent includes a magnetic material. In yet another example, manipulating the composite includes at least one of orientating the golf club head in a predetermined orientation, applying a heat energy to the composite, and applying a magnetic force to the composite. In still another example, manipulating the composite includes: applying the magnetic force to the composite; orientating the golf club head in the predetermined orientation; and applying the heat energy to the composite, wherein the heat energy is applied after at least one of applying the magnetic force to the composite and orientating the golf club head in the predetermined orientation.

In another example of the above aspect, the method further includes adjusting a direction of application of the magnetic force, wherein the adjustment changes a location of the weight constituent within the cavity. In an example, the method further includes setting the composite in the predetermined location. In another example, setting the composite in the predetermined location includes terminating the manipulation of the composite.

In another aspect, the technology relates to a golf club head having: a sole positioned on a bottom side of the golf club head; a striking face positioned toward the front of the golf club head and attached to at least a portion of the sole; an upper portion positioned on a top side of the golf club head such that a cavity is formed between the sole, the striking face, and the upper portion; and a composite disposed in the cavity, wherein the composite includes an adhesive constituent and a weight constituent. In an example, the adhesive constituent has a viscosity of about 4,125 cP (mPa·s) at 300° F., and a viscosity of about 2010 cP (MPa·s) at 350° F. In another example, the weight constituent includes at least one of a powder, a ball, a flake, and a cube. In yet another example, the weight constituent includes at least one of a magnet and a metal. In still another example, the composite includes an adhesive constituent to weight constituent weight ratio of about 1:1.

In another example of the above aspect, the adhesive constituent is tacky. In an example, the composite is disposed proximate a rear portion of the sole.

These and other features, aspects and advantages of the present technology will become better understood with reference to the following drawings, description and claims.

BRIEF DESCRIPTION OF THE DRAWINGS

Non-limiting and non-exhaustive examples are described with reference to the following Figures.

DETAILED DESCRIPTION

Figure 1A:
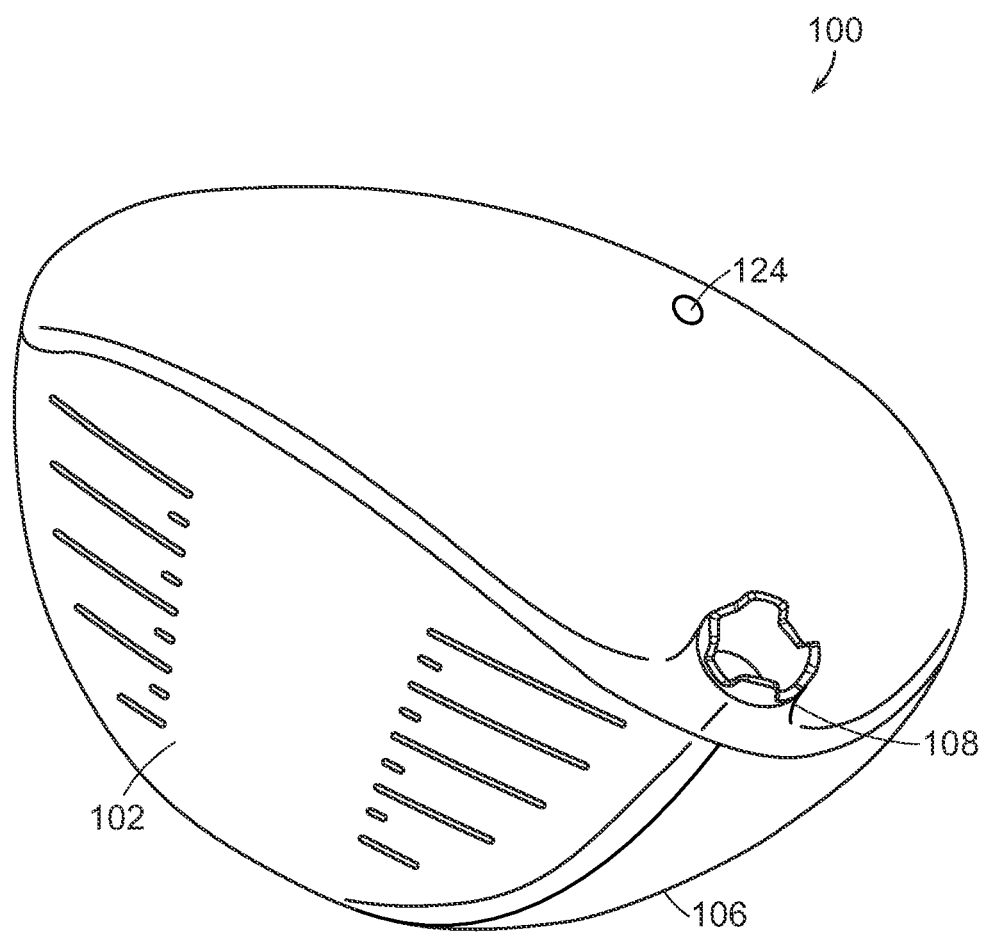
FIG. 1A depicts a perspective view of a golf club head.

Due to manufacturing variances, performance characteristics of a golf club may vary slightly across clubs of the same model. For example, excess materials on various parts of a golf club may change slightly the center of gravity (CG) from a design specification. Further, it may be desirable to manufacture a golf club head of lightweight materials such as ceramics, aluminum, or carbon fibers. However, it may be difficult to adjust or change the CG by utilizing significant volumes of these lightweight materials in the club head. As such, golf club manufacturers typically include with the clubs one or more weights made from heavier, denser materials. These weights may be secured to the exterior of the club head so as to adjust the CG thereof. However, these weights may have other adverse effects on club performance, may be unsightly, or may be prone to loosening over time. Additionally, since these weights must be attached to predetermined attachments points on the body of the club, fine tuning of the various club performance aspects can be limited. As such, the technologies described herein are directed to a golf club head that has included therein weighted materials that may have introduced after manufacture of the club head. The technologies described herein may be utilized with any type of club head that includes a hollow interior or cavity. These may include drivers, fairway metals, hybrid clubs, hollow irons, putters, etc. In this disclosure, the technologies are described in the context of drivers, for clarity.

To enable this introduction of weight and securement thereof in a club head, weights are introduced into an interior of the club head as part of a composite. The composite includes a chemical adhesive constituent and a weight constituent. The adhesive constituent acts as a vehicle for introduction of the weight constituent, as well as a mechanism to secure the weight constituent within the club head, while the interior (cavity) thereof remains generally inaccessible. Further, the adhesive constituent may function to collect or capture manufacturing byproducts that are inherent in club head manufacture, such as hardened glues, metal shards, or other debris. The weight constituent may be a metal, a magnetic metal, or a magnet. Use of magnetic metals or magnets (described herein collectively as "magnetic materials") allows for further manipulation or positioning thereof after introduction of the composite.

The chemical adhesive constituent may be any grade of so-called "hot melt adhesive" that meets the required or desired performance requirements. The adhesive constituent may generally be a pressure sensitive adhesive designed to perform differently at different temperatures. More specifically, the adhesive constituent may be a hot melt type material from H.B. Fuller having a part number HL-2814. Acceptable adhesive constituents display a temperature variable viscosity, which may be more specifically defined as a viscosity of 4,125 cP (mPa·s) at 300° F. and a viscosity of 2,010 cP (mPa·s) at 350° F. Having the variable viscosity at different temperatures allows the adhesive constituent to take on different properties that could allow the adhesive constituent to reach specific locations in a golf club head after introduction thereof. In addition to the viscosity values, the adhesive constituent may have a loop tack of 45 ounces and a 180 degree peel (60 sec/75F, 1 Mil) of 2.2 lbs/inch. These properties help identify the tackiness of the chemical adhesive constituent and how it will attach to interior surfaces of the golf club head. Further, tackiness enables the adhesive constituent to capture debris present within the golf club head, as noted above. The chemical adhesive constituent may generally have a mass of between about 0.1 grams to about 3 grams, more preferably between about 0.1 grams to about 2 grams, and most preferably between about 0.1 grams to about 1 gram.

The weight constituent may be in the form of a dense metal. In examples, the metal may respond to the application of a magnetic field. Such magnetic metals may include ferrous metals such as iron, nickel, cobalt, and alloys of rare earth metals (e.g., tungsten). Additionally, magnets may also be used. The weight constituent may be of any form factor that lends itself to dispersal within the adhesive constituent. These form factors may include powders, shavings, flakes, balls (such as ball bearings), cubes, polygons, or irregular forms. If ball bearings are utilized, those having diameters of less than about 0.25 inches, more preferably less than about 0.125 inches, and more preferably less than about 0.11 inches are contemplated. Cubes of between about 0.1 inches square to about 0.2 inches square are contemplated, more preferably between about 0.1 inches squared to about 0.15 inches squared. Other sizes of weight constituents may be utilized. The weight constituent may generally have a mass of between about 0.5 grams to about 50 grams, more preferably between about 0.5 grams to about 40 grams, most preferably between about 0.5 grams to about 25 grams.

The composite itself may have a weight ratio of chemical adhesive constituent to weight constituent of between about 1:1 to about 1:10, more preferably between about 1:1 to about 1:7, and most preferably between about 1:1 to about 1:5, although other ratios are contemplated. The weight constituent may be mixed into the adhesive constituent when in a substantially liquid state. With the adhesive constituent in the substantially liquid state and the weight constituent distributed therein, the composite may be introduced into the cavity of the club head as described below. Systems and methods of introducing adhesives in a substantially liquid state into the cavity of a club head are described generally in U.S. Pat. No. 10,220,272, the disclosure of which is hereby incorporated by reference herein in its entirety. In another example, this flowable mixture may be cooled; the composite may be pelletized during or after cooling, for example, by using a pelletizer such as the CLS™ pelletizer available from Gala Industries, Inc. The resulting pellets may be introduced into the club head as described below. In another example, the weight constituent is mixed into the adhesive constituent while the latter is in a solid state. The two constituents may be kneaded together with a rubber mill until blended, at which point, the composite may be pelletized. In another example, pellets of solidified adhesive constituents may be coated on the outer sticky surface thereof with the weight constituent (e.g., in the form of a powder). In another example, a weight constituent such as a ball may be pressed through the outer surface of a pellet of adhesive constituent. This may be most easily performed when the adhesive constituent is at a slightly elevated temperature, so as to be more pliable, but not yet melted. In still another example, the composite may be a flowable mixture of finely pelletized adhesive constituents and fine weight constituents (e.g., ball bearings). Once the composite is formed, it may be introduced into the cavity of a club head, as described below.

Figure 1B:
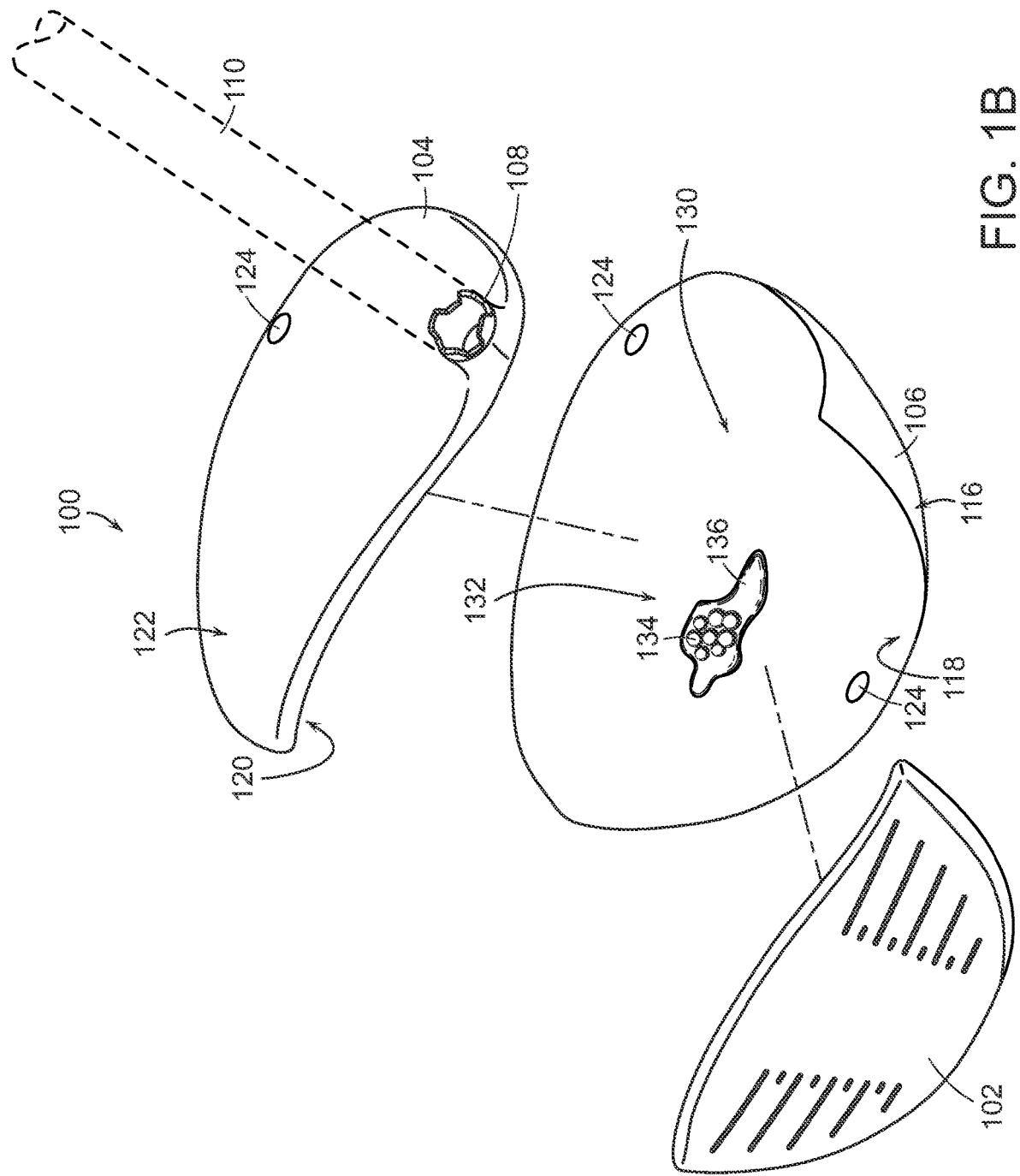
FIG. 1B depicts an exploded perspective view of the golf club head of FIG. 1A.
Figure 1C:
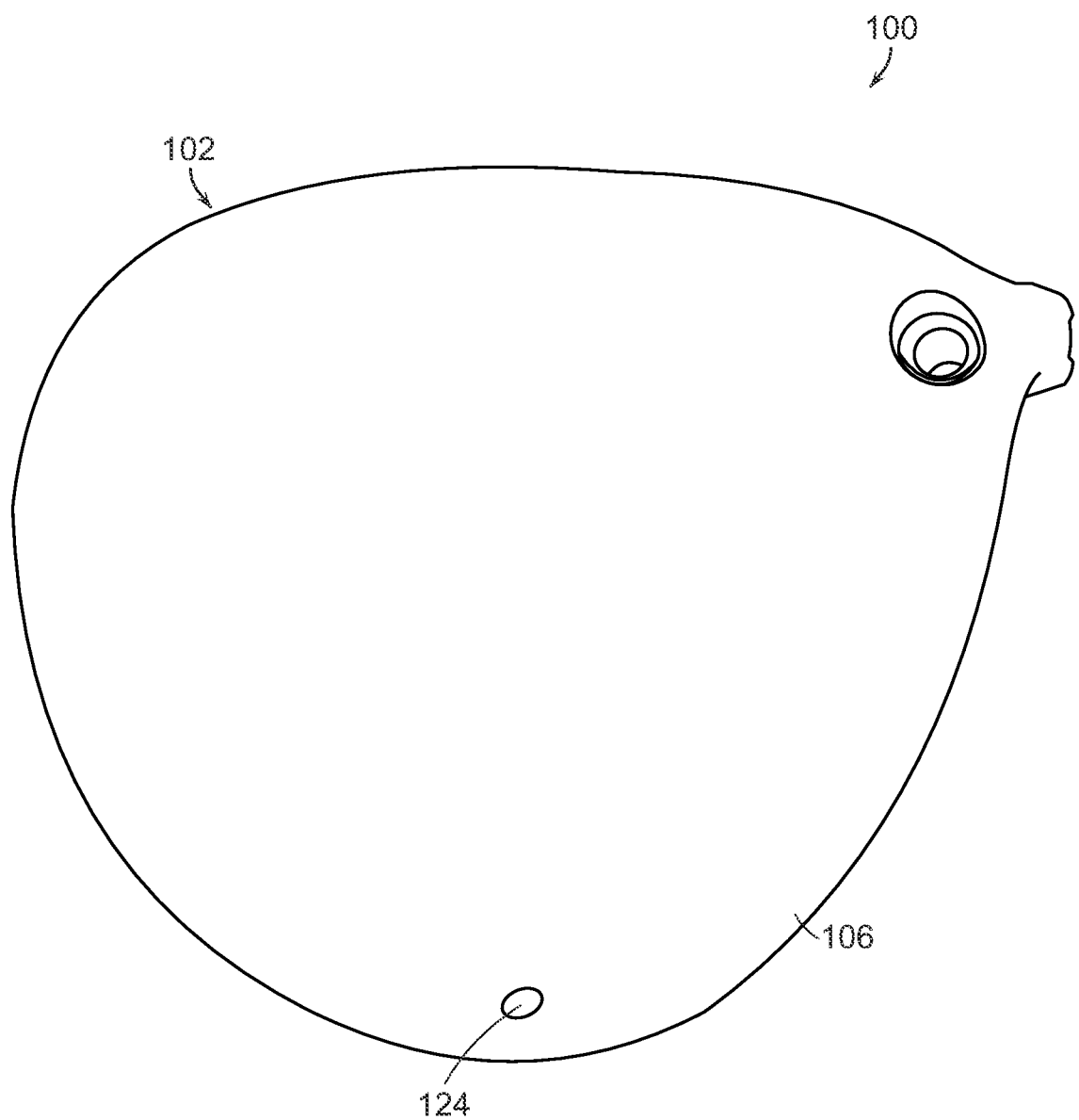
FIG. 1C depicts a bottom view of the golf club head of FIG. 1A.

FIGS. 1A-1C depict an example of a golf club head 100 and are described concurrently. The golf club head 100 includes a club face 102, a crown 104, and a sole 106. The club face 102 may include any type of club face utilized in the manufacture of golf clubs, such as a face insert, a face cup, an L-cup, a C-cup, or other construction, without departing from the scope and content of the present disclosure. The crown 104 forms the upper portion of the club head 100 and is generally made of a rigid material, such as a metal or a rigid composite. The crown 104 has an outer crown surface 122 and an inner crown surface 120. The sole 106 forms the bottom, or underside, portion of the golf club head 100 and is generally also made of a rigid material, such as a metal or a rigid composite. The sole 106 has an outer sole surface 116 and an inner sole surface 118. The crown 104, sole 106, and club face 102, when fitted together, define an interior void or cavity 130 within the golf club head 100. The outer crown surface 122 and the outer sole surface 116 may also be coated with additional substances, such as paints, coatings, or films. In addition, further structures or materials may also be attached to the outer crown surface 122 and the outer sole surface 116. Similarly, the inner crown surface 120 and the inner sole surface 118 may also be coated with additional substances or coatings. The inner crown surface 120 and the inner sole surface 118 may also have structural materials, such as ribs or other components, attached to the surfaces. The golf club head 100 may also include a hosel 108 having components for attaching a shaft 110, as is well-understood by those having skill in the art. While the figures generally depict a driver, the technology discussed herein is equally applicable to fairway metals, hybrid clubs, hollow iron type golf clubs, putters, and other similar clubs containing a hollow cavity.

The outer crown surface 122 and the outer sole surface 116 may define an introduction port 124, a number of which are depicted in FIGS. 1A-1C. Any introduction ports 124 are sized so as to receive the composite introduced after assembly of the crown 104, sole 106, and club face 102; that is, when the interior cavity 130 is generally inaccessible. In general, smaller ports 124 may be utilized to receive an injected composite 132 having an adhesive constituent in a substantially liquid state, with a weight constituent distributed therein; larger ports may be utilized to receive an inserted composite 132 having an adhesive constituent in a substantially solid state, with a weight constituent distributed therein (or thereon). After introduction of the composite 132 via any introduction port 124, the composite 132 is manipulated (as described in more detail below), and ultimately fixed in position within the cavity 130. In the fixed position, a weight constituent (depicted by a plurality of balls 134) are secured against a surface 118 by solidified adhesive constituent 136. In this case, the composite 132 is fixed proximate a rear portion of the sole 106, so as to affect the CG, although any other locations are contemplated. Methods of manufacturing clubs and club heads 100 such as those depicted herein are described below.

Figure 2:
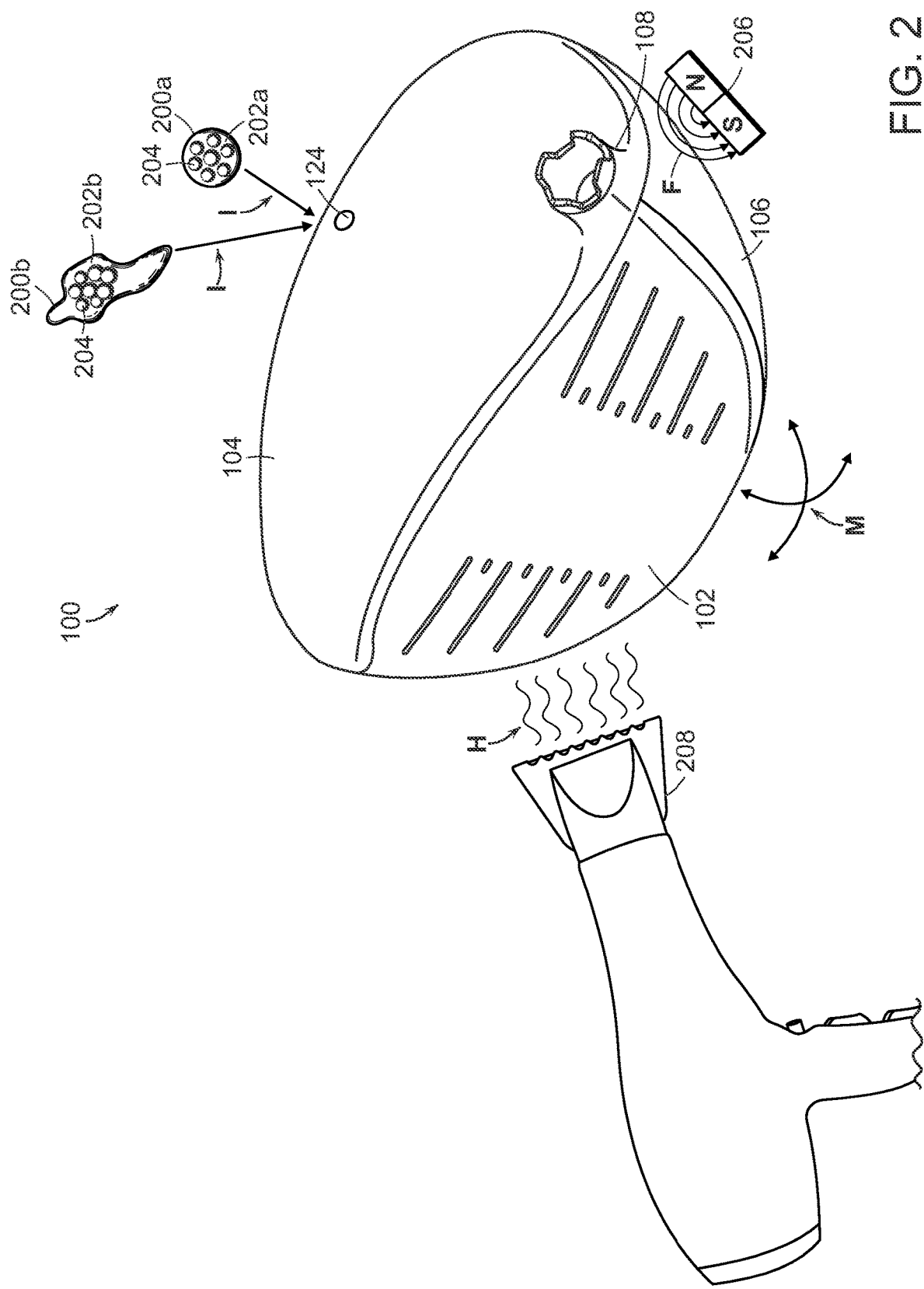
FIG. 2 depicts an example of a golf club head during the manufacturing process.

FIG. 2 depicts an example of a golf club head 100 during manufacturing process. A number of the components of the club head 100 are described above with regard to FIGS. 1A-1C and, as such, are not described further. A composite 200 may be introduced into the cavity of the club head 100 in either a substantially solid form 200a or a substantially liquid form 200b. In the substantially solid form 200a, of the depicted example, an outer pellet of adhesive constituent 202a substantially surrounds one or more weight constituents 204. In the substantially liquid form 200b, one or more weight constituents 204 may be distributed within the flowable adhesive constituent 202b. Once introduced I, the composite 200 may be manipulated in a number of ways. In a first example, the club head 100 may be moved M in any orientation. This movement M changes the position of the composite 200 within the cavity. The substantially solid composite form 200a may roll around within the cavity, while the substantially liquid composite form 200b may flow therein, both being acted upon by the force of gravity. Another manipulation contemplates using a magnet 206 to apply a magnetic force F to the composite 200 (or, more specifically, the magnetic material weight constituents 204 disposed therein). If the composite is in the substantially solid form 200a, the entire composite 200 will move due to the applied magnetic force F, including both the adhesive component 202a and the weight constituent 204. Thus, the magnet 206 may be utilized to move the entire composite 200a to a desired location within the cavity. If the composite is in the substantially liquid form 200b, the weight constituent 204 will be moved, while likely also moving some of the adhesive constituent due to surface tension. Another manipulation contemplates using a heat source 208 to apply heat energy H to the composite. The heat energy H may be in the form of conduction (e.g., placing the club head 100 in an environment having an elevated temperature, such as an oven), convection (e.g., blowing heated air directed against the club head 100, or into the cavity thereof for example via the port 124), induction (e.g., disposing an inductive heater proximate the club head 100), or ultrasound (e.g., directing ultrasound waves towards the club head 100). Application of heat energy H may be used most effectively in combination with movement M to a particular orientation, so as to allow the composite to flow to a low point within the club head 100 based on the orientation of the club head 100. Any other combinations of manipulations may be performed on the club head 100 in order to position the composite (or the constituent components thereof) therein. Once desirably positioned, the various manipulations may be terminated or certain affirmative actions may be taken to set permanently the position of the composite. In an example, one such action includes introducing a cooling agent such as a nitrogen gas into the cavity to solidify the substantially liquid adhesive constituent 202b.

Figure 3:
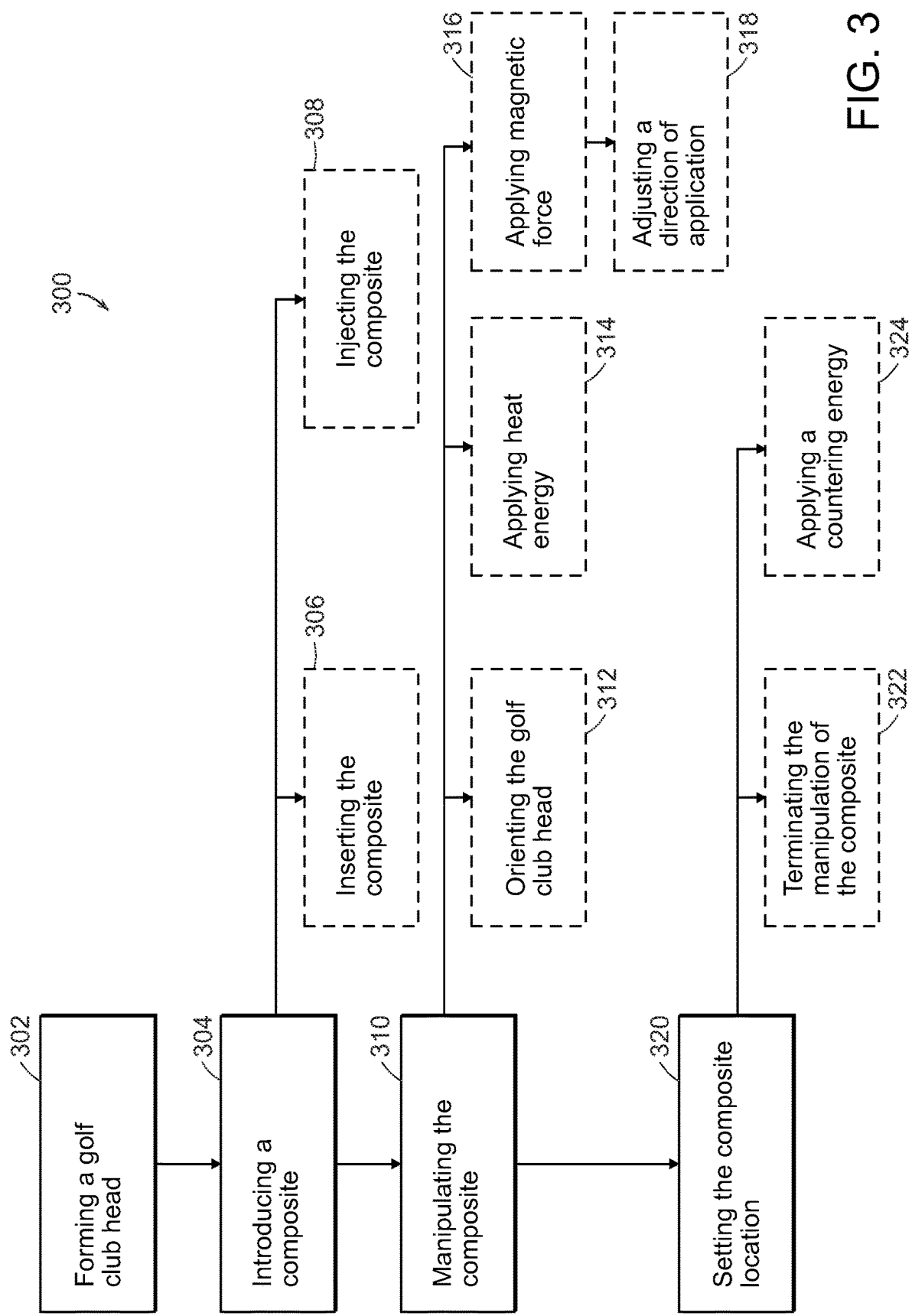
FIG. 3 depicts an example of a method of manufacturing a golf club head.

FIG. 3 depicts an example of a method 300 of manufacturing a club head. The method 300 begins with forming a golf club head, operation 302. As depicted elsewhere herein, the golf club head may include a sole, a crown, and a striking face secured to at least one of the sole and the crown. The sole, the crown, and the striking face at least partially define a cavity. Operation 304 includes introducing into the cavity a composite. The composite includes a chemical adhesive constituent and a weight constituent. If the chemical adhesive is in a substantially solid state, the composite may be inserted into the cavity, operation 306. If the chemical adhesive is in a substantially liquid state, the composite may be injected into the cavity, operation 308.

In order to properly position the composite in the cavity, the method 300 includes manipulating the composite, operation 310, so as to dispose the composite in a predetermined location within the cavity. A number of manipulations are contemplated, alone or in combination. For example, manipulations may include orienting the golf club in a desired orientation, operation 312. Operation 312 leverages the force of gravity to move the composite within the cavity. If the adhesive constituent is in a substantially solid state with the weight constituent therein or thereon, the entire composite may move as a single unit. Flammable composites having a pelletized adhesive constituent and a fine metal constituent may also move such that the components remain generally evenly distributed. If the adhesive constituent is in a substantially liquid state, the heavier weight constituent may move at a greater rate than the viscous adhesive constituent, although a certain amount of adhesive may cling to the magnetic materials due to surface tension.

Another manipulation includes applying a heat energy to the composite, operation 314. As noted herein, heat energy may be applied in the form of conduction, convection, induction, and ultrasound. Still another manipulation includes applying a magnetic force to the composite, operation 316. The application of magnetic force allows the weight constituent in the form of a magnetic material to be moved as a supplement to, or in opposition to, the force of gravity. Thus, by applying magnetic force, the composite may be more accurately positioned, especially if the composite is introduced as a pellet or other solid. The direction of magnetic force application may be adjusted, operation 318, so as to move the entire composite within the cavity (if the adhesive constituent is in a substantially solid state) or move the magnetic material relative to the adhesive constituent (if the adhesive constituent is in a substantially solid state).

In examples, two or more of the manipulations may be performed simultaneously or sequentially. For example, one method contemplates introducing the composite in a single pelletized ball of adhesive constituent with a weight constituent disposed therein, applying the magnetic force (operation 316), then applying the heat energy (operation 314) so as to melt the adhesive constituent to a liquid state. Once cooled (e.g., as described below), the adhesive constituent will maintain the position where it was melted. In a modification of the above example, the application of magnetic force may be adjusted (operation 318), so as to move any magnetic materials away from the adhesive constituent, e.g., to a more desirable location within the cavity.

Once the composite is desirably manipulated and positioned, the location thereof may be set, operation 320. Setting the composite within the cavity may include terminating the manipulation of the composite, operation 322. This may include, for example, holding the golf club head in a particular orientation for a time sufficient to allow a substantially liquid state adhesive constituent to solidify. In another example, the golf club head may be removed from an environment of elevated temperature, which had maintained the adhesive constituent in a substantially liquid state. In another example, a so-called "countering energy" may be directly applied to the composite, operation 324. Such a countering energy may include, for example, introducing a cooling fluid such as cold air or nitrogen gas directly to the substantially liquid adhesive constituent so as to solidify it in place.

All of the numerical ranges, amounts, values, ratios, and percentages such as those for amounts of materials may be read as if prefaced by the word "about" even though the term "about" may not expressly appear in the value, amount, or range. Accordingly, unless indicated to the contrary, the numerical parameters set forth in the above specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the technology are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present disclosure and that modifications may be made without departing from the spirit and scope of the invention as set forth in the following claims.

What is claimed is:

1. A golf club head comprising:
   a sole positioned on a bottom side of the golf club head;
   a striking face positioned toward a front of the golf club head and attached to at least a portion of the sole;
   an upper portion positioned on a top side of the golf club head such that a cavity is formed between the sole, the striking face, and
   the upper portion;
   a hosel;
   a composite disposed in the cavity, wherein the composite comprises an adhesive constituent and a weight constituent, the weight constituent comprising at least a ball bearing; and
   at least one introduction port, defined in at least one of the sole or the upper portion outside of the hosel, which is sized and configured to receive the composite after assembly of the upper portion, sole, and striking face;
   a wherein, when the composite is in a flowable state, the weight constituent is configured to be moved by an external magnet, and the composite is configured to solidify after being moved by the external magnet.

2. The golf club head of claim 1, wherein the adhesive constituent comprises a viscosity of about 4,125 cP (mPa.s) at 300° F., and a viscosity of about 2010 cP (MPa.s) at 350° F.

3. The golf club head of claim 1, wherein the weight constituent further comprises at least one of a powder, a cube, or a flake.

4. The golf club head of claim 1, wherein the weight constituent comprises at least one of a magnet and a metal.

5. The golf club head of claim 1, wherein the composite comprises an adhesive constituent to weight constituent weight ratio of about 1:1.

6. The golf club head of claim 1, wherein the weight constituent comprises a magnetic, ferrous metal.

7. The golf club head of claim 1, wherein the composite is disposed proximate a rear portion of the sole.

8. The golf club head of claim 1, wherein a diameter of the ball bearing is less than 0.125 inches and the weight constituent has a mass between 0.5 grams to 25 grams.

9. A golf club head comprising:
   a sole positioned on a bottom side of the golf club head;
   a striking face positioned toward a front of the golf club head and attached to at least a portion of the sole;
   an upper portion positioned on a top side of the golf club head such that a cavity is formed between the sole, the striking face, and
   the upper portion;
   a hosel;
   a composite disposed in the cavity, wherein the composite comprises an adhesive constituent and a weight constituent, wherein:
      the adhesive constituent comprises a hot melt adhesive;
      the weight constituent includes at least one ball bearing formed from a magnetic material;
      the composite comprises an adhesive constituent to weight constituent weight ratio greater than 1:1 and less than 1.7; and
      the weight constituent has a mass between 0.5 grams to 25 grams
   at least one introduction port, defined in at least one of the sole or the upper portion outside of the hosel, which is sized and configured to receive the composite after assembly of the upper portion, sole, and striking face;
   wherein the adhesive constituent and the weight constituent is introduced into the cavity in a substantially flowable state, wherein, when the composite is in a flowable state, the weight constituent is configured to be moved by an external magnet, and the composite is configured to solidify after being moved by the external magnet.

10. The golf club head of claim 9, wherein the adhesive constituent comprises a viscosity of about 4,125 cP (mPa.s) at 300° F., and a viscosity of about 2010 cP (MPa.s) at 350° F.

11. The golf club head of claim 9, wherein the ball bearing has a diameter of less than 0.125 inches.

12. The golf club head of claim 9, wherein the composite is disposed proximate a rear portion of the sole.

* * * * *